Aug. 10, 1965    J. A. JONES    3,199,134
BRUSHES
Filed Oct. 22, 1962    2 Sheets-Sheet 1

INVENTOR
J.A. Jones

By Watson, Cole, Grindle & Watson
ATTORNEYS.

Aug. 10, 1965    J. A. JONES    3,199,134
BRUSHES

Filed Oct. 22, 1962    2 Sheets-Sheet 2

INVENTOR
J. A. Jones

By Watson, Cole, Grindle & Watson
ATTORNEYS

United States Patent Office 3,199,134
Patented Aug. 10, 1965

3,199,134
BRUSHES
John A. Jones, Parkhurst, Johannesburg, Transvaal, Republic of South Africa, assignor of one-half to Gerald Barit, Johannesburg, Transvaal, Republic of South Africa
Filed Oct. 22, 1962, Ser. No. 232,043
Claims priority, application Republic of South Africa, Oct. 30, 1961, R 61/2,179
7 Claims. (Cl. 15—3.16)

This invention relates to brushes and more particularly to brushes suitable for the cleaning of citrus or other fruit produce prior to the packaging thereof and for use in fruit sorting apparatus.

Citrus produce is generally cleaned by passing the fruit from a trough of cleaning material over a bank of brushes arranged parallel to and adjacent each other. These brushes are of constant circular cross-section, of the same size and driven to rotate in the same direction. It has been found that fruit passing over these brushes tends to rotate at speed in the opposite direction to the brushes with consequent loss of brushing action. Also fruit lying in the hollow formed between adjacent brushes is contacted at only two places by the brush bristles. The fruit also tends to rotate about one axis only and this disadvantage also applies to fruit sorting apparatus known as picking tables.

It is the object of the present invention to provide a brush for the cleaning of citrus or other fruit which will be more effective in brushing than those at present in use and which when used with at least one other brush will cause the fruit to rotate about constantly changing axes.

According to this invention there is provided a rotatable brush comprising an axial form carrying radially projecting bristles and shaped to have a circular transverse cross-section of varying diameter along the length of the brush to give smoothly formed waisted portions at regular intervals.

Further features of this invention provide for the brush to be made with radially projecting bunches of bristles or for the brush to be made from a strip brush and with the bristles arranged along a helical path around the central cylindrical support structure.

The invention also provides for adjacent brushes in a citrus or other fruit cleaning or sorting plant to be complementary in shape so that each brush will mate with those adjacent to it.

Preferred embodiments of this invention will be described with reference to the accompanying drawings in which.

Figure 1:
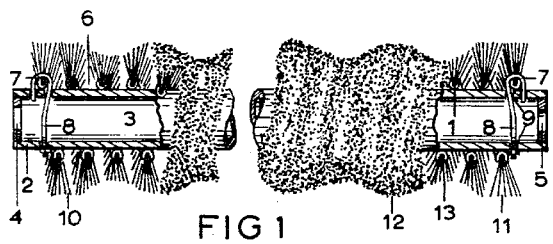
FIG. 1 is a part sectional view of a brush.

As shown in FIG. 1 the brush is made by winding a length of strip brush 1 usually manufactured by the channel lock process onto an axial cylindrical support structure 2. This cylindrical support structure 2 is preferably an aluminium tube 3 having the ends blanked off and fitted at one end with means such as a square recess 4 for connecting the brush to a suitable drive mechanism. The other end has a circular cross-sectional recess 5 adapted to receive a pintle on which the brush is freely rotatable.

The strip brush 1 is wound along a helical path around the axially positioned cylindrical support structure 2 but with a small space 6 between adjacent turns of the strip brush 1. The strip brush 1 is preferably anchored at each end to the tube 3 by means of hook bolts 7 the shanks 8 of which pass through diametrically opposite holes 9 made through the wall of tube 3. The spacing 6 between adjacent turns of the strip brush 1 results in the cylindrical brush formed by the final positioning of the strip brush 1 not being a full pack brush. This assists in the prevention of overbrushing of fruit when the brushes are used in fruit cleaning equipment and also enables the brush to be more easily cleaned and maintained than would be the case with a full pack brush.

To complete the brush made in accordance with this invention the brush is trimmed in any suitable manner so that the brush has a circular transverse cross-section of constant diameter along the end portions 10, 11 and of varying diameter over the remaining length of the brush to give smoothly formed bulbous portions 12 and waisted portions 13 at regular intervals. The brush is shaped, in the examples illustrated, with the sections between adjacent waisted portions symmetrical.

The bristles for the brushes when used for washing of citrus produce may be made from vegetable fibres, bristle, hair or synthetic resin fibres. For washing, polishing and sorting purposes it is considered advisable that vegetable fibres are not used.

Figure 2:
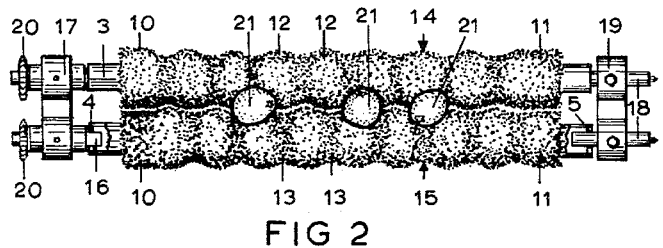
FIG. 2 shows an assembly of two brushes with objects to be cleaned positioned on the brushes.
Figure 2A:
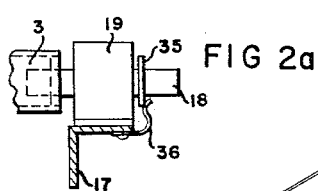
FIGURE 2a shows a detail of the brushes at one end.

FIG. 2 shows an assembly of two brushes made as above described. The brushes 14, 15 may be made from circular cylindrical brushes of a size suitable for the particular requirements to which the brushes are to be put. Suitable sizes, where the brushes are used with citrus produce, for adjacent brushes are one having a maximum diameter of about 5⅝" and the next adjacent brush having a diameter of 4⅞". The brushes 14, 15 have parallel end portions 10, 11 extending inwardly about 3" from each end and the waisted portions 13 are spaced apart about 5" and these waisted portions 13 in this arrangement may conveniently be made ⅜" deep on a 2½" radius.

The brushes 14, 15 are assembled as shown with the bulbous portions 12 of brush 14 positioned in the recesses provided by the waisted portions 13 of brush 15 with a small clearance space between the brushes.

Driving dogs 16 carried in a suitably mounted supporting bearing 17 are engaged in the recess 4 on the brushes 14, 15 and retractable pintles 18 engage in the recesses 5 at the opposite end of the brushes. These pintles 18 are located in suitable mountings 19 directly opposite the corresponding driving dogs 16 and are preferably spring loaded to ensure maintained engagement with the recesses 5 and brushes 14, 15 are freely rotatable on the pintles 18. A collar 35 is secured to each pintle 18 and leaf spring 36 secured to the base of mounting 17 presses on the collar 35 biasing the pintle 18 towards the brush.

The brushes 14, 15 are adapted to be driven at the same rotational speed and in the same direction by means of sprockets 20 on the driving dogs 16 located outside the bearings 17.

It will be noted that the helical paths of the bristles around the cylindrical support structures of brushes 14, 15 are arranged to be of opposite hands.

In use, the objects 21 to be brushed take up the positions shown and the shape of the outer surface of the mating brushes 14, 15 and since the peripheral speed of the outer surfaces of the brushes in contact with the surface of the objects 21 varies over that surface a very positive brushing action is obtained and also the objects are caused to rotate about constantly varying axes thus ensuring that all the parts of the surfaces of the objects are thoroughly brushed.

Figure 3:
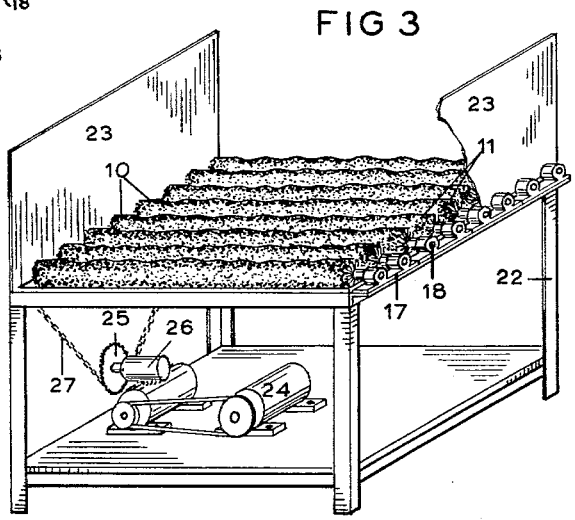
FIG. 3 shows a general view of a citrus processing plant.
Figure 4:
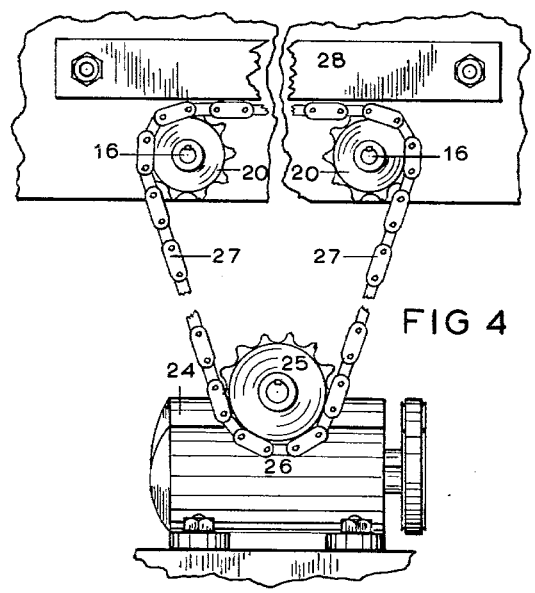
FIG. 4 shows a detail of the drive arrangement for the brushes.

Banks of brushes assembled together as above described are particularly suitable for use in fruit processing plants. FIGS. 3 and 4 relate to citrus processing plant and more particularly to the washing section of such plant.

A suitable frame 22 carries the series of bearings 17 and pintles 18 necessary for the bank of brushes which are arranged to have their bristle spiral paths of opposite hands on alternate brushes, and also, the brushes are arranged to have smaller maximum diameter brushes alternately interspersed between brushes of larger maximum diameter. This difference in brush diameter also accentuates the peripheral speed variation of the parts of the brushes in contact with fruit being cleaned.

Side boards 23 project upwardly along each side of the frame and the parallel end portions 10, 11 on each brush prevents the fruit packing up against these side boards so that the fruit is confined to move through the plant over the whole bank of brushes. In this plant, and using brushes of the order of size above referred to, the brushes are driven to rotate at speeds of about 150 revolutions per minute.

The drive arrangement for the brushes which is more clearly seen from the detail shown in FIG. 4 consists of a suitable motor 24 coupled to a driving sprocket 25 through reduction gearing 26.

A chain 27 is passed over the sprocket 25 and the series of sprockets 20 on the driving dogs 16 and is retained in contact with sprockets 20 by means of a suitably positioned retention plate 28.

Fruit is fed from the cleaning troughs onto the first pair of brushes and as the following fruit contacts the fruit on the brushes the latter move forwardly onto the next brushes and the direction of rotation of the brushes is the same as the direction of the passage of fruit through the plant. The interaction of the brushes on the fruit ensures that the fruit is thoroughly cleaned and tumbled to ensure all parts of its surface are brushed.

Figure 5:
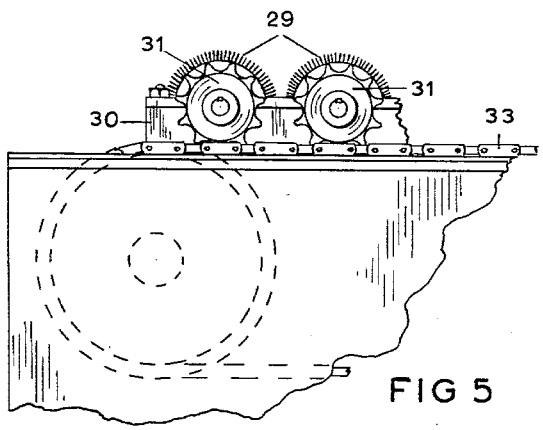
FIG. 5 shows a general view of a part of fruit sorting equipment.

FIG. 5 illustrates a further use of the brush assembly in fruit processing plants. In this embodiment the brushes are arranged in a bank to form supporting members 29 of what is generally called a picking table where the fruit travels passed persons who sort and discard undesirable fruit. The brushes are mounted in suitable bearings 30 at each end and are also caused to rotate at speeds of about 60 revolutions per minute about their own axes. This may be conveniently effected by means of sprockets 31 secured to the ends of the brushes engaging moving chain length 33. The fruit progresses along the table in the same manner as that described for the washing plant.

The tumbling of fruit on brushes of the kind referred to ensures that all the surface of the fruit is exposed to the sorters and consequently sorting may be more easily and effectively accomplished.

It will be understood that the above description is not limitative of the manner in which the brush is manufactured. As an alternative example the brush may be made from bristles of a constant length secured to a specially shaped cylindrical support structure which will give the desired waisted outer configuration to the completed brush. Further, and particularly where fruit of an oval shape is to be dealt with, the waisting of the brushes will preferably be of a more serrated type of outer configuration to ensure twisting of the fruit during the brushing operation.

Also the brushes may be made as a punched type of brush, that is, where bunches of bristles are secured in holes arranged in the cylindrical support structure and following a suitable path. It is also possible to manufacture the brushes to mate with each other with the waisted portions irregularly spaced along the length of the brush if this is for an reason desirable.

What I claim as new and desire to secure by Letters Patent is:

1. An assembly of a plurality of laterally adjacent rotatable brushes with the brushes arranged in a substantially horizontal plane, each brush comprising a cylindrical support structure, bristles projecting radially from said support structure and shaped to have a circular transverse cross-section of varying diameter along the length of the brush to give smoothly formed alternate waisted and bulbous portions at regular intervals, each brush positioned to have its bulbous portions fitting into the recesses provided by the waisted portions of the adjacent brush and means for rotating the brushes in the same direction.

2. An assembly of a plurality of rotatable brushes as defined in claim 1 wherein adjacent brushes have different maximum transverse cross-sectional diameters.

3. An assembly of a plurality of rotatable brushes as defined in claim 1 wherein the brush bristles are bunched and arranged on helical paths around the cylindrical support structure of adjacent brushes and the helical paths of adjacent brushes arranged to be of opposite hands.

4. In citrus fruit processing plant an assembly of a plurality of laterally adjacent rotatable brushes with the brushes arranged in a substantially horizontal plane and means for driving the brushes at the same rotational speed and in the same direction, each brush comprising a cylindrical support structure, bristles projecting radially from said support structure and shaped to have a circular transverse cross-section of varying diameter along the length of the brush to give smoothly formed alternate waisted and bulbous portions at regular intervals, and each brush positioned to have its bulbous portions fitting into the recesses provided by the waisted portions of the adjacent brush.

5. In a fruit sorting plant, an assembly of a plurality of laterally adjacent rotatable brushes with the brushes arranged to form the supporting surface of a picking table, each brush comprising a cylindrical support structure, bristles projecting radially from said support structure and shaped to have a circular transverse cross-section of varying diameter along the length of the brush to give smoothly formed alternate waisted and bulbous portions at regular intervals, and each brush positioned to have its bulbous portions fitting into the recesses provided by the waisted portions of the adjacent brush, and means for driving the brushes to rotate about their axes at the same rotational speed and in the same direction.

6. A rotatable brush comprising a cylindrical support structure, bristles projecting substantially radially from said support structure and shaped to have a circular transverse cross-section of constantly varying diameter to provide alternate waisted and bulbous sections having equal radii of curvature whereby a plurality of such brushes arranged parallel to each other are enabled to accommodate complementarily the bulbous portion of one brush in the waisted portion of the adjacent brush such that the portions of the brushes in juxtaposition are equi-distant from each other along the whole length of the brushes.

7. A rotatable brush as defined in claim 6 wherein the bristles are arranged on a helical path around said support structure and are made from a strip brush.

References Cited by the Examiner
UNITED STATES PATENTS

| | | | |
|---|---|---|---|
| 1,848,309 | 3/32 | Brogden | 15—3.2 X |
| 2,099,222 | 11/37 | Paxton | 15—3.17 |
| 2,221,159 | 11/40 | Willard | 15—3.17 |
| 2,412,565 | 12/46 | Davis | 15—3.17 X |
| 2,898,881 | 8/59 | Straley | 99—103 |
| 2,924,838 | 2/60 | Jones et al. | 15—3.17 X |

CHARLES A. WILLMUTH, *Primary Examiner.*